US012599856B2

(12) United States Patent
    Perez De Alderete et al.

(10) Patent No.: US 12,599,856 B2
(45) Date of Patent: Apr. 14, 2026

(54) FLUID FILTER SYSTEM WITH AUTO DRAIN

(71) Applicant: AXI INTERNATIONAL CORPORATION, Fort Myers, FL (US)

(72) Inventors: Abel Perez De Alderete, Naples, FL (US); Alexander F Goodfellow, Cape Coral, FL (US)

(73) Assignee: AXI INTERNATIONAL CORPORATION, Fort Myers, FL (US)

( * ) Notice: Subject to any disclaimer, the term of this patent is extended or adjusted under 35 U.S.C. 154(b) by 368 days.

(21) Appl. No.: 18/024,222

(22) PCT Filed: Sep. 2, 2021

(86) PCT No.: PCT/US2021/048856
    § 371 (c)(1),
    (2) Date: Mar. 1, 2023

(87) PCT Pub. No.: WO2022/051487
    PCT Pub. Date: Mar. 10, 2022

(65) Prior Publication Data
    US 2023/0271121 A1      Aug. 31, 2023

Related U.S. Application Data

(60) Provisional application No. 63/073,517, filed on Sep. 2, 2020.

(51) Int. Cl.
    *B01D 36/00*          (2006.01)
    *B01D 29/52*          (2006.01)
    (Continued)

(52) U.S. Cl.
    CPC ........... *B01D 36/006* (2013.01); *B01D 29/52* (2013.01); *B01D 29/56* (2013.01); *B01D 35/153* (2013.01)

(58) Field of Classification Search
    CPC ...... B01D 36/006; B01D 29/52; B01D 29/56; B01D 35/153; B01D 27/06; B01D 35/16; B01D 37/04; B01D 36/001
    See application file for complete search history.

(56) References Cited

U.S. PATENT DOCUMENTS

| | | |
|---|---|---|
| 5,788,859 A | 8/1998 | Biere |
| 8,231,793 B2 | 7/2012 | Hacker |

(Continued)

OTHER PUBLICATIONS

Extended European Search Report regarding EP21865105.7, dated Jul. 5, 2024 (5pgs.).

(Continued)

*Primary Examiner* — Waqaas Ali
(74) *Attorney, Agent, or Firm* — Hahn Loeser & Parks LLP

(57) ABSTRACT

A fluid filter system with auto-drain capabilities. The fluid filter system includes at least one filter, a vent check valve, a filter outlet check valve, an openable valve, a drain pump and a drain pump check valve. The filter includes a filter head having an inlet, an outlet and a drain outlet, a removable filter element, and a suction tube in fluid communication with the drain outlet and extending into the removable filter element. The vent check valve has an inlet exposed to atmosphere and an outlet in fluid communication with an interior volume of the filter. The filter outlet check valve has an outlet and an inlet in fluid communication with the outlet of at least one filter head.

12 Claims, 3 Drawing Sheets

(51) Int. Cl.
  *B01D 29/56* (2006.01)
  *B01D 35/153* (2006.01)

(56) References Cited

U.S. PATENT DOCUMENTS

| | | | |
|---|---|---|---|
| 2004/0237485 A1* | 12/2004 | Beer | .................. F16H 57/0402 |
| | | | 55/385.3 |
| 2006/0021922 A1 | 2/2006 | Lamberts Van Assche | |
| 2012/0292240 A1 | 11/2012 | Hacker et al. | |
| 2018/0133631 A1 | 5/2018 | Willems et al. | |
| 2018/0161702 A1* | 6/2018 | Poirier | .................. B01D 29/56 |

OTHER PUBLICATIONS

International Search Report regarding PCT/US21/48856, mailed Dec. 14, 2021 (2 pgs.).
Written Opinion of the International Searching Authority regarding PCT/US21/48856, mailed Dec. 14, 2021 (6 pgs.).
Communication pursuant to Article 94(3) EPC regarding related EP 21865105.7, dated May 9, 2025 (4 pgs.).

* cited by examiner

FLUID FILTER SYSTEM WITH AUTO DRAIN

CROSS-REFERENCE TO RELATED APPLICATIONS

The present application claims priority from and the benefit of international application number PCT/US21/48866, filed Sep. 2, 2021, entitled "Fluid Filter System with Auto Drain," pending; which claims priority from and the benefit of U.S. Provisional Application No. 63/073,517 filed Sep. 2, 2020, entitled "Fluid Filter System with Auto Drain".

BACKGROUND

On-site backup/emergency electrical generation is often provided by a liquid-fueled electrical generator unit and a fuel tank. Such installations are common, for example, at mission-critical sites, such as hospitals. In such sites, base, or belly, tanks are rectangular in shape and sit below the generator, providing enough fuel volume to run for a specific period. The base/belly tank is then refilled from the main tank when its fuel level gets low. However, in the absence of a power outage, fuel turnover is very low and only consumed during periodic equipment testing. Actual power outages may be few and far between, allowing for large volumes of stagnant fuel on site. This provides ample opportunity for fuel degradation and contamination.

A fuel polisher may be added to the fuel storage tank to withdraw fuel from the tank and convey the fuel through a filter to remove contaminants, then return the cleaned fuel to the tank. Filters in fuel polishers typically include a filter head with inlet and outlet ports and a spin-on filter element. They are traditionally installed with the filter head located above the filter element (the filter element is screwed on from the bottom). During use, the filter elements accumulate fluid within the filter element housing. During replacement of traditionally-mounted spin on filters, the filter elements entrap working fluid. Special care must be taken during filter replacement to avoid spillage. Even if the filter element is removed without spilling fuel or contaminants, the filter element must be drained before disposal and the fuel and contaminants safely disposed of.

SUMMARY OF THE INVENTION

A fluid filter system with auto-drain capabilities is provided. The fluid filter system includes at least one filter, a vent check valve, a filter outlet check valve, an openable valve, a drain pump and a drain pump check valve. The filter includes a filter head having an inlet, an outlet and a drain outlet, a removable filter element, and a suction tube in fluid communication with the drain outlet and extending into the removable filter element. The vent check valve has an inlet exposed to atmosphere and an outlet in fluid communication with an interior volume of the filter. The filter outlet check valve has an inlet in fluid communication with the outlet of at least one filter head and a check valve outlet.

The openable valve is in fluid communication with the drain outlet of the filter. The drain pump has an intake in fluid communication with the openable valve and an output. The drain pump check valve has an inlet in fluid communication with the output of the drain pump and an outlet in fluid communication with the outlet of the filter outlet check valve.

The outlet of the filter outlet check valve may be in fluid communication with a fluid reservoir. The vent check valve may be in fluid communication with the inlet volume of filter. The vent valve may be installed on filter head. The openable valve may comprise a solenoid valve.

The filter element may comprise a spin-on canister filter element. The suction tube may extend into an interior volume of the spin-on canister element.

BRIEF DESCRIPTION OF THE DRAWINGS

Describing various embodiments of the invention will reference the following drawings (may not be drawn to scale).

DETAILED DESCRIPTION OF THE INVENTION

Figure 1:
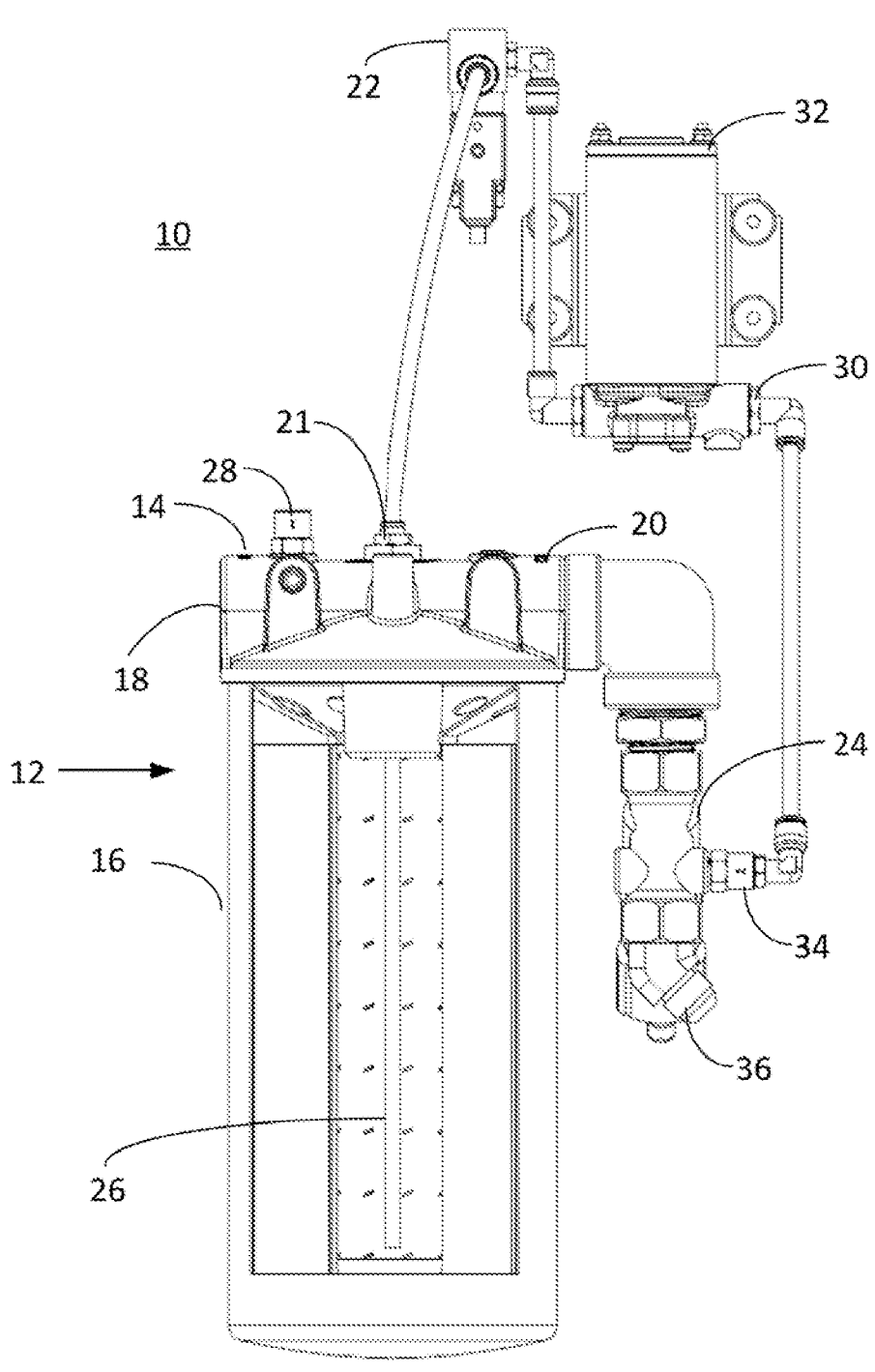
FIG. 1 is an illustration of an example of a system according to the present invention.
Figure 2:
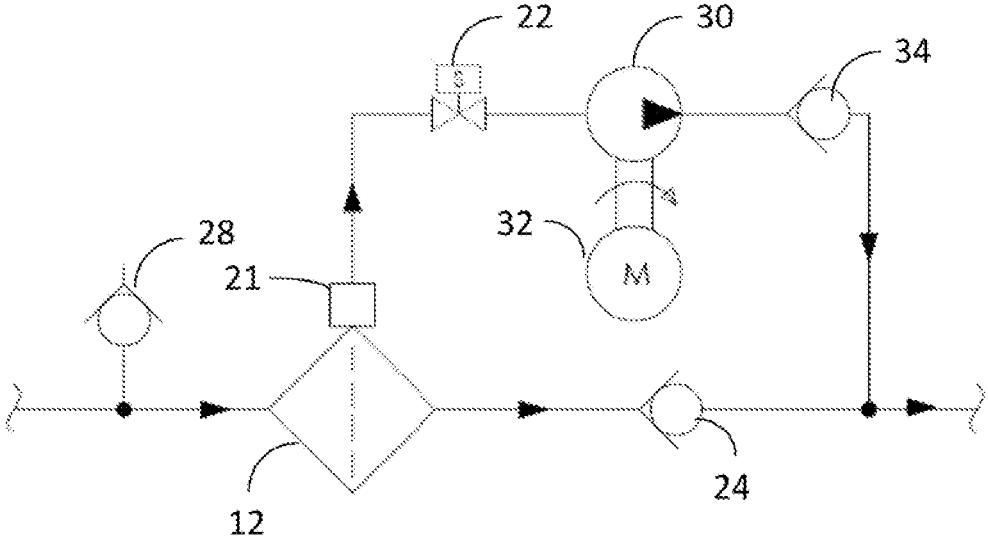
FIG. 2 is a schematic diagram of the system according FIG. 1.

As illustrated in FIGS. 1 and 2, an example of a fluid filter system 10 with automatic drain capabilities is illustrated. The fluid filter system 10 includes one or more filters 12, an openable valve 22, and a drain pump 30. While the example below is described with respect to a fuel filtering system, the application may be applied to additional fluid filtering applications.

Figure 3:
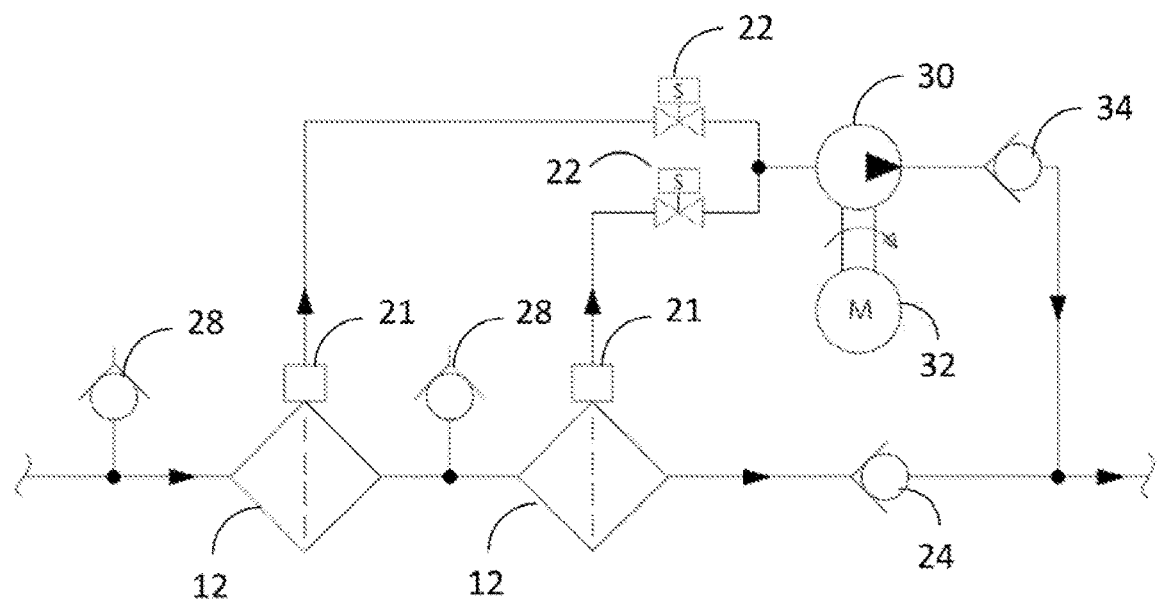
FIG. 3 is a schematic diagram of another example of system according to the present invention with filters in series.
Figure 4:
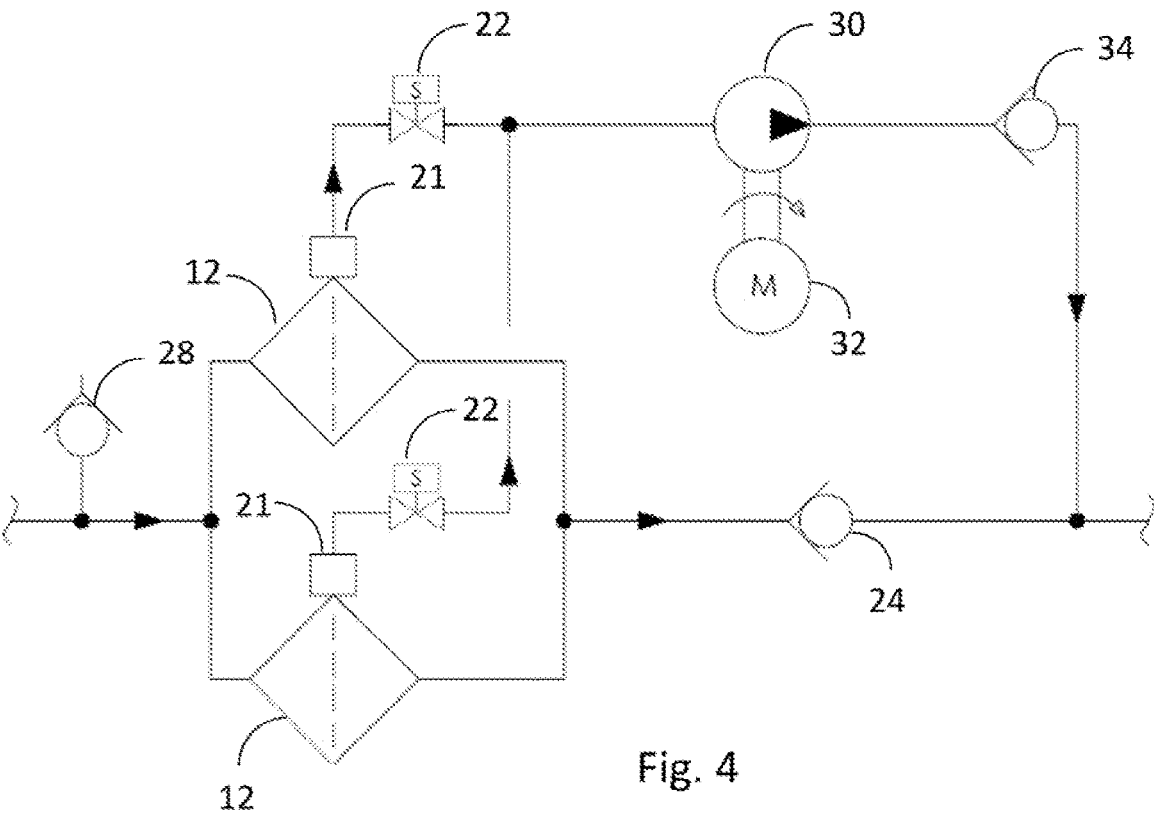
FIG. 4 is a schematic diagram of another example of according to the present invention with filters in parallel.

Each filter 12 comprises a spin-on filter element 16 and a filter head 14. The filter 12 has an inlet 18 on the left side and an outlet 20 on the right side. There is a single filter in the example of FIGS. 1 and 2, but fluid filter system 10 may be readily adapted to additional filters in series and to filters in parallel as illustrated in FIGS. 3 and 4, respectively.

The filter head 14 includes a drain outlet 21 extending through the center of the filter head. A suction tube assembly 26 is fitted to the drain outlet 21. The suction tube 26 preferably extends into a "clean" volume of the filter element 16. For example, in FIG. 1, suction tube 26 extends into a volume defined by the interior of the filter element 16. Fuel is introduced to the filter element 16 on the outside of the filter medium or membrane, and passes through the filter membrane to a center of the filter element, where it is withdrawn from the filter element 16.

Filter routing valve 22 is in fluid communication with the drain outlet 21 of the filter head 14 and to an inlet of drain pump 30. The routing valve 22 is an openable valve, and may comprise an electrically operated solenoid valve to selectively couple the drain outlet 21 to the drain pump 30. In some embodiments, the routing valve 22 is coupled to the drain outlet by a tube or other fluid conduit. In some embodiments, the routing valve 22 is coupled to the drain outlet by being mounted on the filter head 14.

Drain pump 30 is driven by motor 32. An outlet of drain pump 30 is in fluid communication with check valve 34 installed on a fuel return fitting 36. Fuel return fitting 36 is in fluid communication with a fuel tank which is being serviced by the fluid filter system 10. Motor 32 and routing valve 22 may be automatically operated by a controller or manually operated.

Filter outlet check valve 24 is coupled to the filter head outlet 20. As used herein, the term "check valve" means any device which allows fluid to flow in one direction, and blocks ("checks") fluid flowing in the reverse direction. Check valve 34 is installed fluidly downstream of check valve 24, such that when routing valve 22 is open and motor 32 is operated to cause pump 30 to withdraw fluid from the filter element, check valve 34 permits fuel to flow into fuel return fitting 36 and check valve 24 prevents flow of pumped fluid back into the filter element 16.

Vent check valve 28 is also provided and coupled with its inlet to the atmosphere and outlet to inlet 18 (FIG. 1) or outlet 20 of the filter head 14. This allows venting of the filter volumes during draining, which prevents fuel being drawn from the fuel tank and reduces the risk of the filter media collapse due to vacuum during operation of drain pump 30. The primary or lift fuel pump will be off during a filter change, and this should provide sufficient impairment to fuel flow to prevent the drain pump from drawing fuel from the fuel tank. However, one or more valves between the fuel tank and the fuel filter may also be closed to prevent inadvertently drawing fuel from the fuel tank during a filter change operation.

During normal operation, routing valve 22 is closed, and fluids flow from inlet 18 to outlet 20 of filter head 14 through the filter element 16 and check valve 24. During the filter replacement process, the flow of the fluid to the filter 12 is stopped. The fluid remaining in filter 12 is actively removed by opening routing valve 22 and operating motor 32 and drain pump 30. This draws fluid from the filter element 16 through drain outlet 21. The drain pump 30 pushes the fluid downstream of check valve 24, which is installed to prevent back flow though the filters 12 being serviced. Because the fuel pumped out of the filter element is withdrawn from the clean volume of the filter element 16, it may be returned to the fuel tank via the fuel return fitting 36, and does not require separate disposal.

After the filter 12 is drained by the routing valve 22 and drain pump 30, the routing valve 22 is typically automatically closed. The filter element 16 may be removed with almost no fluid spilled. New filter elements may then be easily installed. If not performed before filter element replacement, after new filter element installation and before resumption of operation, the routing valve 22 is closed and fluid flow is again routed through the filters 12.

Another example of the present invention is illustrated in FIG. 3. The components are the same as in FIGS. 1 and 2, and the description of such components is not repeated for purposes of brevity. The example of FIG. 3 differs from FIG. 2 in that two filters 12 are mounted in series. Configuring filters 12 in series allows for two step removal of contaminants. For example, one filter 12 may be a water separator filter and one filter may comprise a particulate filter. Alternatively, the filters in series may have different porosity, e.g., ten micron and two micron, to allow coarse and fine filtering. An additional routing valve 22 is included, one for each filter 12, to allow for selective filter draining. Normal operation and filter draining operations are the same as with respect to FIGS. 1 and 2.

Another example of the present invention is illustrated in FIG. 4. The components are the same as in FIGS. 1 and 2, and the description such components is not repeated for purposes of brevity. The example of FIG. 4 differs from FIGS. 1 and 2 in that the filters 12 are mounted in parallel rather. Due to this arrangement, one fewer vent check valve 28 is needed, which may be configured external to the filter heads 14 on the inlet sides. Configuring filters in parallel allows for extended operation intervals between filter replacement. An additional routing valve 22 is included, one for each filter 12, to allow for selective filter draining.

Normal operation and filter draining operations are the same as with respect to FIGS. 1 and 2.

The fluid filter system 10 may be used in combination with a fuel pump to serve as a fuel polisher for a fuel tank for a liquid-fueled electrical generator unit. However, the fluid filter system 10 may be used in additional environments and applications, such as other types of stationary fuel storage tanks. The fluid filter system 10 may be also used in automotive and marine applications. The fluid filter system 10 may be also used for fluids other than liquid fuels and their respective fluid reservoirs.

As may be seen from the examples presented herein, the fluid conduits, check valves, and solenoids may be rearranged into additional variations of fluid conduits, check valves, and solenoids without departing from the scope of the invention. Various embodiments may include different number of filters and valves installed, as well as components of different size. For example, additional filters may be connected in tandem or in parallel. Various embodiments may be installed and/or retrofitted on various equipment operating with various working fluids.

What is claimed is:

1. A fluid filter system, comprising:
   at least one filter having a filter head with an inlet, an outlet and a drain outlet, a spin-on removable filter element, and a suction tube in fluid communication with the drain outlet and extending into an Interior volume of the spin-on removable filter element, the filter head being located above the spin-on removable filter element;
   a vent check valve having an inlet exposed to atmosphere and an outlet in fluid communication with an interior volume of the filter;
   a filter outlet check valve having an inlet in fluid communication with the outlet of the at least one filter head, and an outlet;
   an openable valve in fluid communication with the drain outlet of the filter;
   a drain pump having an intake in fluid communication with the valve, and an output; and
   a drain pump check valve having an inlet in fluid communication with the output of the drain pump and an outlet in fluid communication with the outlet of the filter outlet check valve.

2. The fluid filter system of claim 1, wherein the outlet of the filter outlet check valve is in fluid communication with a fluid reservoir.

3. The fluid filter system of claim 1, wherein the vent check valve is in fluid communication with the inlet volume of the filter.

4. The fluid filter system of claim 1, wherein the vent check valve is installed on filter head.

5. The fluid filter system of claim 1, wherein the openable valve comprises a solenoid valve.

6. The fluid filter system of claim 1, wherein the at least one filter comprises a first filter and a second filter coupled in series, each filter having a filter head with an inlet, an outlet and a drain outlet, a removable filter element, and a suction tube in fluid communication with the drain outlet and extending into the removable filter element.

7. The fluid filter system of claim 6, further comprising a first valve coupled to the drain outlet of the first filter and a second valve coupled to the drain outlet of the second filter.

8. The fluid filter system of claim 1, wherein the at least one filter comprises a first filter and a second filter coupled in parallel, each filter having a filter head with an inlet, an outlet and a drain outlet, a removable filter element, and a suction tube in fluid communication with the drain outlet and extending into the removable filter element.

9. The fluid filter system of claim 8, further comprising a first valve coupled to the drain outlet of the first filter and a second valve coupled to the drain outlet of the second filter.

10. The fluid filter system of claim 1, wherein the filter element comprises a spin-on canister filter element.

11. A fluid filter system, comprising:

at least one filter having a filter head with an inlet, an outlet and a drain outlet, a removable filter element, and a suction tube in fluid communication with the drain outlet and extending into the removable filter element;

a vent check valve having an inlet exposed to atmosphere and an outlet in fluid communication with an interior volume of the filter;

a filter outlet check valve having an inlet in fluid communication with the outlet of at least one filter head, and an outlet;

an openable valve in fluid communication with the drain outlet of the filter;

a drain pump having an intake in fluid communication with the valve, and an output; and a drain pump check valve having an inlet in fluid communication with the output of the drain pump and an outlet in fluid communication with the outlet of the filter outlet check valve;

wherein the at least one filter comprises a first filter and a second filter coupled in parallel, each filter having a filter head with an inlet, an outlet and a drain outlet, a removable filter element, and a suction tube in fluid communication with the drain outlet and extending into the removable filter element.

12. The fluid filter system of claim 11, further comprising a first valve coupled to the drain outlet of the first filter and a second valve coupled to the drain outlet of the second filter.

* * * * *